Patented Nov. 20, 1951

2,575,440

UNITED STATES PATENT OFFICE 2,575,440

CROTONATE ESTERS OF GLYCERYL POLY-ETHERS OF DIHYDRIC PHENOLS

Theodore F. Bradley, Oakland, Calif., assignor to Shell Development Company, San Francisco, Calif., a corporation of Delaware No Drawing. Application November 16, 1948,
Serial No. 60,409

7 Claims. (Cl. 260—47)

This invention relates to a new class of organic esters. More particularly, the invention pertains to crotonic acid esters from polyhydric alcohols of a special type.

Crotonic acid esters from certain polyhydric alcohols such as ethylene glycol, glycerol, diglycerol and polyallyl alcohol have been known heretofore. I have now discovered a new class of crotonic acid esters from a different type of material which is or acts like a polyhydric alcohol. I have further discovered that these new crotonic acid esters of my invention possess certain unexpected properties which are particularly advantageous with respect to the utility thereof.

In general terms, the esters of my invention are polyethers having a plurality of alternating glyceryl radicals and divalent aromatic groups linked through ether oxygen and having at least four crotonyloxy groups

linked to the glyceryl radicals by ester linkage, any valence bonds of the glyceryl radicals which do not link to said ethereal oxygen and said crotonyloxy groups being joined to hydroxyl groups. The new esters include compounds which may be represented by the formula

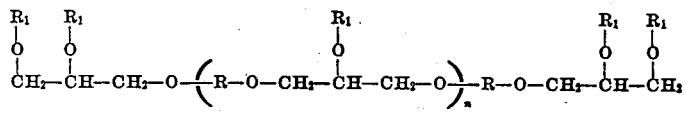

wherein $n$ is an integer preferably of 1 to 7, such as 4, R is a divalent aromatic radical and $R_1$ is a crotonyl radical or a hydrogen, said compound containing, however, at least four crotonyl groups.

The esterifiable polyethers employed in preparing the products of the invention are obtained by reacting a dihydric phenol in alkaline solution with epichlorhydrin. These polyethers are of resinous character in that they contain a chain of divalent aromatic hydrocarbon radicals from the dihydric phenol, and aliphatic radicals from the epichlorhydrin, these two types of radicals alternating and being joined by ethereal oxygen atoms. The terminal groups of the polyethers may contain 1,2-epoxy groups due to the presence of glycidyl radicals thereat.

Any of the various dihydric phenols are used in preparing these esterifiable resinous polyethers including mononuclear phenols, such as resorcinol, catechol, hydroquinone, methylresorcinol, etc., or polynuclear phenols like bis-(4-hydroxyphenyl) - 2,2-propane(bis - phenol), 4,4' - dihydroxy benzophenone, bis-(4-hydroxyphenyl)-1,1 - ethane, bis - (4 - hydroxyphenyl) - 1,1 - isobutane, bis - (4 - hydroxyphenyl) - 2,2 - butane, bis - (4 - hydroxy - 2 - methylphenyl) - 2,2 - propane, bis - (4 - hydroxy - 2 - tertiary butyl phenyl) - 2,2 - propane, bis - (2 - dihydroxynaphthyl)-methane, 1,5-dihydroxy naphthalene, etc.

The esterifiable polyethers are prepared by heating at 50 to 150° C. the dihydric phenol with epichlorhydrin using one to two or more mols of epichlorohydrin per mol of dihydric phenol. Also present is a base such as sodium, potassium, calcium or barium hydroxide in amount of 10 to 30% stoichiometric excess of the epichlorhydrin, e. g., 1.1 to 1.3 equivalents of base per mol of epichlorhydrin. In effecting the reaction the dihydric phenol is mixed with the aqueous solution of base and heated. The epichlorhydrin is then added rapidly to the stirred reaction mass. The initial reaction is somewhat exothermic so that the temperature will rise to some extent, but then heating is applied for several hours while stirring whereupon the taffy-like resinous polyether forms. While still hot, the reaction product is washed with water until free of base.

The resulting resinous polyether is a complex mixture rather than being a single chemical compound. However, the principal product may be represented by the formula

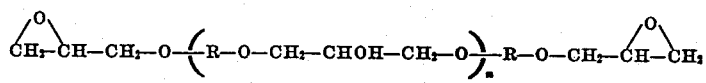

wherein $n$ is an integer preferably of 1 to 7, such as 4, and R represents the divalent hydrocarbon radical of the dihydric phenol. The length of the chain (the value of $n$) can be made to vary by changing the molecular proportions of epichlorhydrin to dihydric phenol. Thus, by decreasing the mols of epichlorhydrin per mol of dihydric phenol from about two downwards toward one, the molecular weight, the softening point and the number of esterifiable groups are increased. The esterifiable groups in the polyether are hydroxyl groups as well as epoxy groups. Upon reaction with the crotonic acid both of these groups form ester linkages.

The nature of the polyethers from the dihydric phenols can be better understood by considering preparation of a particular product which I prefer to use in my invention. This product will hereinafter be designated by the term Resin A.

RESIN A

In a reaction vessel fitted with a stirrer 4 mols of bis - (4 - hydroxyphenyl) - 2,2 - propane(bis - phenol) and 6.43 mols of sodium hydroxide as a 10% aqueous solution are immersed and heated. To this hot solution are added 5 mols of epichlorhydrin while the reaction mixture is stirred. The temperature is adjusted so that the mixture is heated at about 100° C. for 80 minutes and is maintained at 100 to 104° C. for an additional 60 minues under reflux. Thereafter, the aqueous layer is decanted and the resin is washed with boiling water until neutral to litmus whereupon the resulting polyether is drained and dehydrated by heating to about 150° C.

The polyether has a softening point of 100° C. (Durran's Mercury Method) and a molecular weight of 1133 measured by boiling point elevation of a dioxane solution. The equivalent weight to esterification of the product is 174. This is obtained by heating a sample of the polyether with about twice the theoretical amount of higher fatty acid necessary to react with all of the hydroxyl and epoxy groups, the higher fatty acid being Neofat No. 3 consisting of about 50% linoleic acid, 40% oleic acid, and 10% stearic acid. The heating is effected at about 230° C. until a constant acid value is obtained. By back titrating the unreacted fatty acid with base, a measure is obtained from which the equivalent weight to esterification may be calculated.

In like manner, other polyethers of bis-phenol may be prepared which will have different molecular weights depending upon the molar ratio of epichlorhydrin to dihydric phenol used in preparation thereof. This fact is illustrated by the following table which shows the variation in properties with variations in molar ratio.

| Mol Ratio Epichlorhydrin to bis-Phenol | Mol Ratio NaOH to Epichlorhydrin | Softening Point | Molecular Weight | Equiv. Wt. to Esterification |
|---|---|---|---|---|
| | | °C. | | |
| 2.0 | 1.1 | 43 | 451 | 110 |
| 1.4 | 1.3 | 84 | 791 | 130 |
| 1.33 | 1.3 | 90 | 802 | 160 |
| [1] 1.25 | 1.3 | 100 | 1,133 | 174 |

[1] Resin A.

Polyethers of still higher molecular weight are best obtainable by reacting a polyether of lower molecular weight with a small quantity of dihydric phenol. For example, a resinous polyether having a melting point of about 130° C. and an equivalent weight to esterification of 190 is obtained by reacting Resin A with 5% of added bisphenol. This reaction is effected by heating the resin to 150° C. and then adding the bis-phenol. The heating is continued for about two hours while gradually increasing the temperature to about 200° C. while stirring the reaction mass.

The crotonic acid esters of the invention are prepared by heating and esterifying the resinous ethers with the acid. The esterification is effected at about 100 to 200° C. in the presence or absence of known esterification catalysts such as sulfuric acid, phosphoric acid, toluene-sulfonic acid, and the like. Since water is a product of the reaction, it is often desirable to have present an inert azeotropic agent capable of removing the formed water by distillation. Toluene is an excellent material for this purpose although other suitable agents include benzene, hexane, dichloroethyl ether, and the like. When it is desired to completely esterify the polyether with crotonic acid the esterification is effected while heating and boiling the reaction mixture with removal of the formed water of reaction by distillation until no further water is evolved. Crotonate esters which are not completely esterified are prepared by discontinuing the esterification prior to coupling of all the hydroxyl groups in the polyether with the crotonic acid.

The crotonic acid esters of the invention are particularly valuable in that they are all solid substances at normal temperature (20° C.) and are capable of air-drying or baking in air so as to form very hard and durable films suitable as surface coating materials. Moreover, the esters polymerize to hard resins and also are excellent materials for copolymerizing with other compounds. Illustration of methods of preparing a few of the products of the invention as well as showing properties thereof are given in the following examples wherein the parts are by weight.

Example I

About 53 parts of Resin A were mixed and heated with 25 parts of crotonic acid. A stream of carbon dioxide was passed intermittently through the reaction mass to sweep out water and to prevent oxidation. The heating was continued for 31 hours at a temperature which began at 170° C. and finally rose to 230° C. The reaction mixture was then dissolved in benzene and titrated to determine the extent of esterification which was found to be 83.5%. The crotonic acid ester was a solid product.

Example II

Into a flask fitted with a reflux condenser and water trap were placed 10.6 parts of Resin A and 50 parts of crotonic acid along with 1.8 parts of concentrated sulfuric acid as esterification catalyst. The mixture was heated at 80 to 100° C. in a stream of carbon dioxide for 3 hours. The resulting product was dissolved in benzene and washed with dilute sodium bicarbonate. Upon coating a glass panel with the benzene solution of the ester and baking at 130° C. for 30 minutes, a hard, tough film of the polymerized crotonate was obtained.

Example III

About 53 parts of Resin A, 25 parts of crotonic acid and 9 parts of xylene were placed in a flask fitted with a reflux condenser and phase separation head. The reaction mixture was heated at 170 to 190° C. for 24 hours while collecting the formed water of reaction. The resulting ester was dissolved in benzene so as to make a 30% solution. The solution was coated on a glass plate and baked at 130 to 140° C. for 30 minutes. A clear, hard film of the polymerized resin was obtained.

Example IV

Into a reactor fitted with a distilling column and a phase separating head were placed 530 parts of Resin A, 1000 parts of crotonic acid, 87 parts of xylene and 1 part of p-toluene sulfonic acid. The mixture was boiled under an atmosphere of carbon dioxide while distilling water therefrom for 28 hours at a temperature of about 160 to 170° C. Near the end of the heating period the excess crotonic acid was removed as distillate. The acid number of the resulting solid ester was determined and found to be 4.9.

The crotonic acid ester obtained in the above example was tested for solubility and found soluble in an equal weight of the following solvents: benzene, toluene, xylene, methyl ethyl ketone, acetone, methyl isobutyl ketone, 80% toluene and 20% methyl ethyl ketone, 80% xylene and 20% n-butyl alcohol, 80% xylene and 20% monobutyl ether of ethylene glycol, and 80% xylene and 20% acetone.

Excellent resinous polymers may be prepared from the crotonate esters of the invention. The esters are polymerized by heating preferably at 50 to 200° C. in the presence of a peroxide polymerization catalyst such as benzoyl peroxide, acetal peroxide, tertiary butyl hydroperoxide, lauroyl peroxide, ditertiary butyl peroxide and the like in amount of about .05 to 5%. The crotonate esters are also of particular value in form of copolymers with other polymerizable compounds. When copolymerized in admixture with mono-olefinic compounds which normally give fusible polymers, the esters enable infusible copolymers with such compounds to be obtained. Depending upon the properties desired in the copolymers, various proportions of the crotonate ester may be used in admixture with the copolymerizable compound such as from 5 to 75% of the ester.

*Example V*

Copolymers of the crotonate ester prepared as described in Example IV were obtained with various compounds. Equal parts by weight of the crotonate ester in admixture with vinyl acetate, methyl acrylate, methyl methacrylate, and styrene were heated at 60 to 75° C. in the presence of 2% added benzoyl peroxide. Infusible copolymers of the two component mixtures were obtained in 1 to 8 hours' time.

*Example VI*

Copolymers which were hard and clear were also obtained when equal parts by weight of the crotonate ester of Example IV were copolymerized in like manner with diallyl succinate, diallyl adipate, diallyl phthalate, and allyl vinyl phthalate.

*Example VII*

Upon heating the crotonate ester of Example IV alone in the presence of 2% added benzoyl peroxide at 75° C. the ester becomes stiff and plastic within about 20 minutes and is converted to a hard, infusible resin in about 4 hours.

While the crotonate esters of the invention are valuable substances to form resinous polymers, they are particularly suitable as film-forming agents of good resistance to contact with deteriorating substances such as acids, alkalies and water. Films of the crotonate esters are best applied to surfaces desired to be protected as solutions and the film is set up or cured by briefly baking at elevated temperatures of preferably 100 to 200° C. The use of conventional metal driers or peroxide catalysts are helpful in hardening the film of crotonate ester. The customary metallic driers such as lead, cobalt or manganese, linoleate, rosinate or naphthenate are suitable.

*Example VIII*

A 50% solution in xylene of the crotonate ester prepared as described in Example IV was spread on glass plates. One sample contained no added catalyst or drier while another contained 0.05% cobalt based on the ester as cobalt naphthenate. The films were allowed to dry at ordinary temperature for a few minutes and then baked at 150° C. for 30 minutes. In each case a clear, water-white, hard, tough film of high gloss was obtained.

In like manner, strips of sheet steel were coated with the crotonate ester in the presence and absence of the cobalt drier with curing by baking at 150° C. for 30 minutes. The resulting cured films were unchanged after being immersed 18 hours in water at 25° C. or being heated one-half hour at 100° C. in SAE 20 lubricating oil or being contacted for 30 minutes with 2% acetic acid or being contacted 30 minutes with 2% aqueous sodium hydroxide solution. The films had a Sward Hardness of 34 and a Taber Abrasion of 10–12 mg. of 100 cycles.

The crotonate esters of the invention are unusual in that they have better properties of compatability with other resinous materials than is the case with esters of other unsaturated acids. In order to take advantage of this property, I prefer to form mixed esters from crotonic acid with the other unsaturated acids; particularly drying oil fatty acids such as are contained in linseed oil, tung, soybean oil and the like. These mixed esters likewise contain at least four crotonyl groups therein, but the remainder of the esterifiable bonds are joined to the drying oil fatty acids.

*Example IX*

A mixed ester of crotonic acid and soybean fatty acid of Resin A was prepared by heating 1275 parts of Resin A with 850 parts of soybean fatty acid and 375 parts of crotonic acid. The heating was effected in a reaction vessel fitted with a distillation head so as to permit collection of water. During the heating the reaction mass was kept under an atmosphere of carbon dioxide. The heating was continued for 6 hours at a temperature of 230° C. whereby the mixed ester having an acid number of 13.2 was obtained.

In like manner, 1555 parts of soybean acid was esterified with 945 parts of Resin A for a period of 6 hours at 230° C. whereby the drying oil fatty acid ester having an acid number of 24.9 was obtained.

The mixed ester and the drying oil acid ester were admixed with 40% melamine-formaldehyde resin (Melmac 245–8) and dissolved in an equal weight of hydrocarbon solvent. Each of the two varnishes was coated on steel panels and the ester films were set by baking for 1½ hours at 150° C. The resulting film from the mixed ester was hard, clear and resistent to deteriorating effects of water. On the other hand, the ester of the drying oil acid alone gave a film which was very cloudy owing to incapability of the ester with the melamine-formaldehyde resin.

If desired, the partial crotonic acid ester of the polyether may be modified in like manner with other monocarboxylic acids such as acetic acid, stearic acid, benzoic acid, etc.

I claim as my invention:

1. A crotonic acid ester of the formula

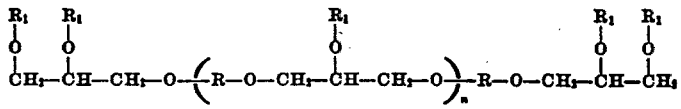

where $n$ is an integer of 1 to 7, R is a divalent aromatic hydrocarbon radical, at least four $R_1$'s are crotonyl radicals, and each of any remaining $R_1$'s is a member of the group consisting of hydrogen and acyl radicals of a drying oil fatty acid.

2. A crotonic acid ester of the formula

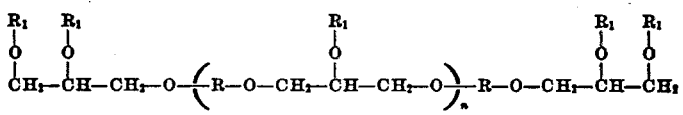

wherein $n$ is an integer of 1 to 7, R is the 2,2-bis(4-phenylene)propane radical, at least four $R_1$'s are crotonyl radicals, and any remaining $R_1$'s are hydrogen.

3. A polymer of a crotonic acid ester of the formula

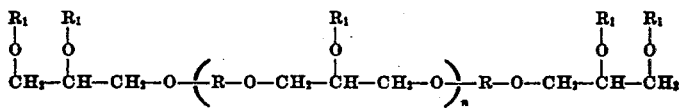

wherein $n$ is an integer of 1 to 7, R is the 2,2-bis(4-phenylene)propane radical, at least four $R_1$'s are crotonyl radicals, and any remaining $R_1$'s are hydrogen.

4. A copolymer of a crotonic acid ester of the formula

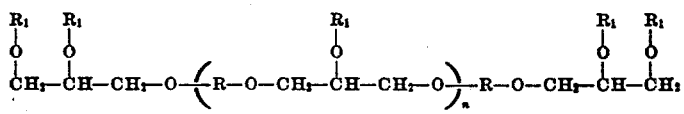

wherein $n$ is an integer of 1 to 7, R is the 2,2-bis(4-phenylene)propane radical, at least four $R_1$'s are crotonyl radicals, and any remaining $R_1$'s are hydrogen, and a compound of the group consisting of vinyl acetate, methyl acrylate, methyl methacrylate, styrene, diallyl succinate, diallyl adipate, diallyl phthalate, and allyl vinyl

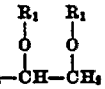

phthalate, said copolymer containing from 5 to 75% of said crotonic acid ester.

5. A copolymer of a crotonic acid ester of the formula

wherein $n$ is an integer of 1 to 7, R is the 2,2-bis(4-phenylene)propane radical, at least four $R_1$'s are crotonyl radicals, and any remaining

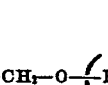

$R_1$'s are hydrogen, and diallyl phthalate, said copolymer containing about an equal weight of said crotonic acid ester.

6. A copolymer of a crotonic acid ester of the formula

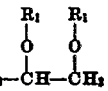

wherein $n$ is an integer of 1 to 7, R is the 2,2-bis(4-phenylene)propane radical, at least four

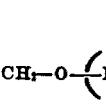

$R_1$'s are crotonyl radicals, and any remaining $R_1$'s are hydrogen, and styrene, said copolymer containing about an equal weight of said crotonic acid ester.

7. A copolymer of a crotonic acid ester of the formula

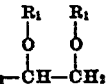

wherein $n$ is an integer of 1 to 7, R is the 2,2-bis(4-phenylene)propane radical, at least four $R_1$'s are crotonyl radicals, and any remaining $R_1$'s are hydrogen, and methyl methacrylate, said copolymer containing about an equal weight of said crotonic acid ester.

THEODORE F. BRADLEY.

REFERENCES CITED

The following references are of record in the file of this patent:

UNITED STATES PATENTS

| Number | Name | Date |
|---|---|---|
| 2,359,622 | Coleman et al. | Oct. 3, 1944 |
| 2,500,765 | Montague | Mar. 14, 1950 |

FOREIGN PATENTS

| Number | Country | Date |
|---|---|---|
| 579,698 | Great Britain | Aug. 13, 1946 |